(No Model.)
P. E. HOKANSON & B. J. DOLPHIN.
BICYCLE ATTACHMENT.
No. 556,350. Patented Mar. 17, 1896.
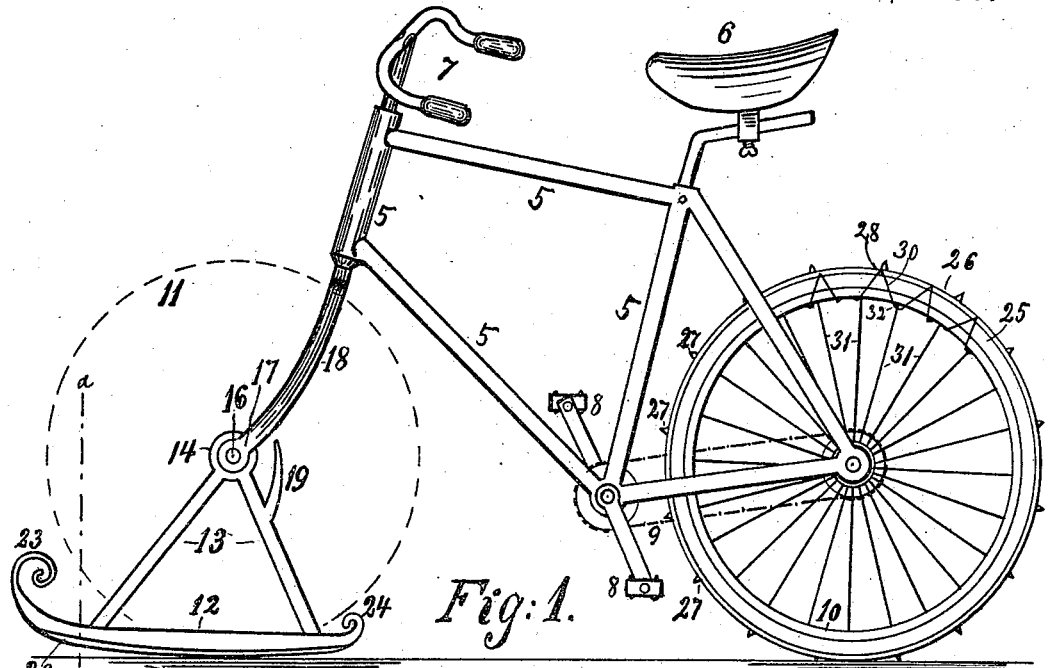
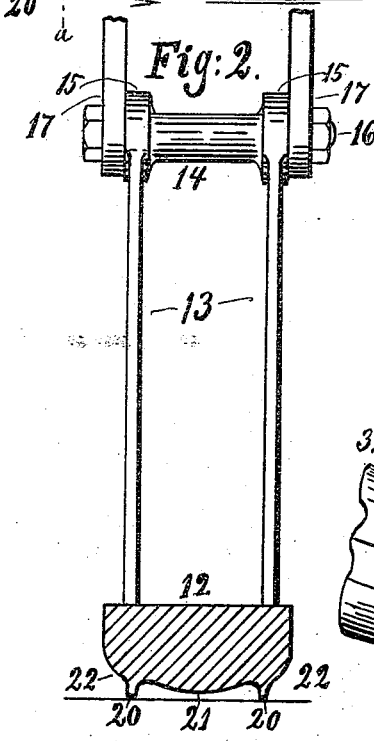
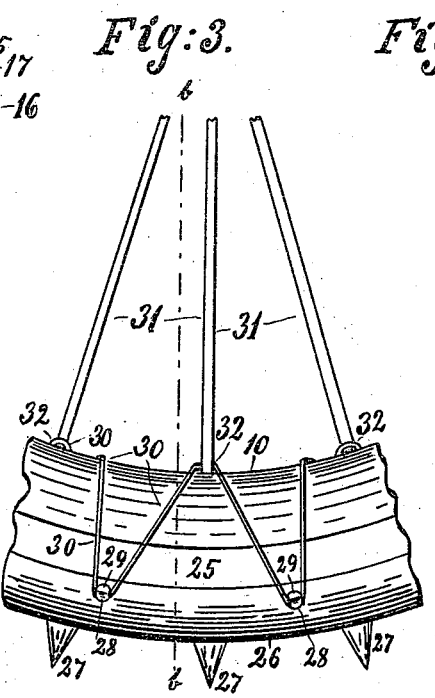
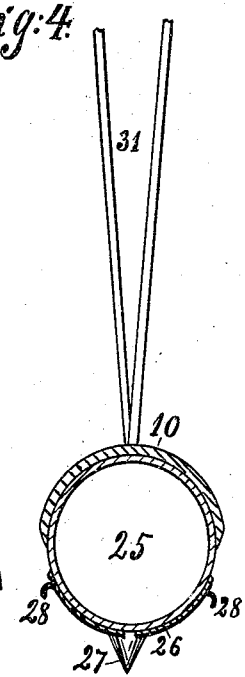
WITNESSES:
J. Hokanson
Petter Carlsen
INVENTORS:
Paul E. Hokanson & Byron J. Dolphin
BY their ATTORNEY:
A. M. Carlsen

UNITED STATES PATENT OFFICE.

PAUL E. HOKANSON AND BYRON J. DOLPHIN, OF MINNEAPOLIS, MINNESOTA, ASSIGNORS OF ONE-HALF TO LARS A. HOKANSON AND GUST N. NELSON, OF SAME PLACE.

BICYCLE ATTACHMENT.

SPECIFICATION forming part of Letters Patent No. 556,350, dated March 17, 1896.

Application filed February 21, 1895. Serial No. 539,309. (No model.)

*To all whom it may concern:*

Be it known that we, PAUL E. HOKANSON and BYRON J. DOLPHIN, citizens of the United States, residing at Minneapolis, in the county of Hennepin and State of Minnesota, have invented certain new and useful Improvements in Bicycles; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in bicycles.

The object of the invention is to provide bicycles with simple but effective attachments which will enable the machine to be used on ice and snow, as well as on the bare ground when the attachments are removed.

With this and other objects in view the invention consists in the novel construction and arrangement of parts illustrated in the accompanying drawings, in which—

Figure 1 is a side elevation of a bicycle of the "safety" type with our attachments secured to it and with the handles of the machine shown slightly in perspective. Fig. 2 is an enlarged front sectional view on the line *a a* in Fig. 1. Fig. 3 is an enlarged side view of a portion of the rear carrier-wheel, by which the bicycle is also driven. Fig. 4 is a sectional view on the line *b b* in Fig. 3.

Referring to the various parts in the drawings by reference-numerals, 5 is the frame, 6 the seat, 7 the handles, 8 the pedals, 9 the drive-chain, and 10 the hind wheel, of the regular safety-bicycle.

The front wheel 11 is only indicated by a dotted circle, as the wheel is in the present instance removed in order to give room for the runner attachment, which consists of the runner 12, having the rigid braces 13, which are united at their upper ends by a rigidly-secured tubular hub 14, provided with ball-bearings 15, in which is journaled the shaft 16, which ordinarily serves as the shaft or stud for the front wheel to revolve upon and which has its ends secured in the lower ends 17 of the steering-fork 18.

19 is a stop provided upon one of the rear braces 13 and adapted to touch with its free end against one of the arms 17 of the fork, and thus prevent the joint 16 from bending too far forward in case the runner should suddenly meet some unusual resistance on the ground.

The runner 12, it will be observed, is made in one single piece and has its bottom provided with two parallel ribs 20, between which the bottom of the runner is bulged down, as at 21 in Fig. 2, not quite so low down as the bottom of the ribs 20, and outside the ribs 20 the body of the runner has its sides rounded, as at 22, so that the runner in making sharp turns with the bicycle may clear the ground when leaning over to either side and leave one of the ribs 20 to have a guiding-hold of the ice or snow. In riding with the runner standing straight the two ribs 20 may be in use, if riding on ice. If on snow the bottom between the ribs will form the supporting-surface, while the ribs help to guide and prevent the runner from slipping sidewise on either ice or snow or a mix of the two, which is the most common condition of the ground in the winter season. It will also be observed that the entire bottom of the runner 12 and its ribs 20 are slightly curved from end to end, so that the runner touches the ground hardest in the middle, and is thus easy to turn in steering and may be run either forward or backward, even on pretty rough ground and in more or less snow. The curved ends or horns 23 and 24 are for ornamental purposes.

The driving-wheel 10 is of the ordinary style of bicycle-wheels with a hollow rubber tire 25, adapted to be pumped full of air, the pressure of which may be increased or decreased at pleasure.

26 is an internally-grooved metallic band fitting upon the rubber tire and provided with a peripherical row of round pointed pegs 27, secured therein and adapted to take hold of the ice or icy ground. This band 12 is, further, near its two edges provided with the hooks 28, which are formed out of tongues partly punched out of the holes 29 in the band 26.

30 is a cord, wire, wire rope or other suitable string passed zigzag over the felly of the wheel and engages the hooks 28 of the band 26 on both sides of the wheel. It also engages the spokes 31 of the wheel in the manner best shown at 32 in Fig. 3, so as to hold the band from slipping off to either side.

In operation, when the bicycle is to be used on ground covered with ice or snow the front carrier-wheel is removed and the hub 14 of our runner substituted for the hub of the wheel. The wind is partly let out of the rubber tire on the hind wheel, so that the iron or metal band 26 will slip upon it. The rubber tire is then filled properly with air, and the lacing-string 30 is applied as a further safeguard for keeping the band in place.

In order to change the bicycle back into condition for use in summer, the lace 30 and the band 26 are removed, as is also the runner 12 and its braces 15 and hub 14, and the front carrier-wheel is put in its usual place again. The runner 12 and its ribs 20 may be made in one or more pieces and produced in so many various ways that we do not wish to bind ourselves to any exact way of building it. We are also aware that the braces 13 may be of a greater or lesser number than shown in the present drawings, so we do not wish to bind ourselves to a certain number of them.

We are aware that prior to our invention bicycles have been provided with some kind of runners and wheels having mud-hooks or corrugations for propelling the machine, so we do not claim these elements broadly; but

What we claim, and desire to secure by Letters Patent, is—

In a bicycle the combination with the steering-fork 18, of the hub 14, adapted to be substituted for the hub of the front wheel, the braces 13, extending downward from said hub 14, and the segmental-shaped runner 12, secured to the lower ends of the braces and a stop as 19, or its equivalent provided upon one of the braces and touching against the back of the fork so as to limit the tilting of the runner, substantially as set forth.

In testimony whereof we affix our signatures in presence of two witnesses.

PAUL E. HOKANSON.
BYRON J. DOLPHIN.

Witnesses:
A. M. CARLSEN,
J. HOKANSON.